US012615335B2

(12) United States Patent
Carlson

(10) Patent No.: US 12,615,335 B2
(45) Date of Patent: Apr. 28, 2026

(54) VOICE FINGERPRINTING SYSTEM FOR DETECTING HOAX EMERGENCY REPORTS

(71) Applicant: General Dynamics Mission Systems, Inc., Fairfax, VA (US)

(72) Inventor: Lindsey Skyler Carlson, Bothell, WA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 154 days.

(21) Appl. No.: 18/732,780

(22) Filed: Jun. 4, 2024

(65) Prior Publication Data

US 2025/0373727 A1 Dec. 4, 2025

(51) Int. Cl.
| | |
|---|---|
| *G10L 15/00* | (2013.01) |
| *G10L 17/02* | (2013.01) |
| *G10L 17/04* | (2013.01) |
| *G10L 17/06* | (2013.01) |
| *G10L 17/18* | (2013.01) |
| *G10L 25/18* | (2013.01) |
| *G10L 25/24* | (2013.01) |
| *H04M 3/22* | (2006.01) |
| *H04M 3/51* | (2006.01) |
| *G06Q 50/26* | (2012.01) |

(52) U.S. Cl.
CPC .......... *H04M 3/5116* (2013.01); *G10L 17/02* (2013.01); *G10L 17/04* (2013.01); *G10L 17/06* (2013.01); *G10L 17/18* (2013.01); *G10L 25/18* (2013.01); *G10L 25/24* (2013.01); *H04M 3/2281* (2013.01); *H04M 3/5175* (2013.01);

*H04M 3/5191* (2013.01); *G06Q 50/265* (2013.01); *H04M 2201/405* (2013.01)

(58) Field of Classification Search
None
See application file for complete search history.

(56) References Cited

U.S. PATENT DOCUMENTS

| | | | | |
|---|---|---|---|---|
| 10,659,588 | B1 * | 5/2020 | Guan | G10L 17/04 |
| 11,172,064 | B2 * | 11/2021 | Björsell | H04L 65/1046 |
| 11,240,360 | B2 * | 2/2022 | Guan | G10L 17/00 |
| 11,423,926 | B2 * | 8/2022 | Enzinger | H04L 63/14 |
| 11,451,658 | B1 * | 9/2022 | Frenkel | H04M 3/2281 |
| 11,539,834 | B1 * | 12/2022 | Buentello | G10L 15/1822 |
| 11,558,506 | B1 * | 1/2023 | Cardillo | G10L 17/26 |
| 11,606,461 | B2 * | 3/2023 | Frenkel | H04M 3/2281 |

(Continued)

*Primary Examiner* — Satwant K Singh

(74) *Attorney, Agent, or Firm* — Ingrassia Fisher & Lorenz, LLP

(57) ABSTRACT

The data capture system, coupled to the emergency response system, captures speech utterances from incoming callers and uses those utterances to construct embeddings representing the captured speech utterances, the embeddings collectively representing a latent vector space and being stored in a data store within computer readable media. The query system communicates with the data store and provides an interface accessible to the call center operators that alerts a call center operator—substantially while an incoming emergency call is being received—the number of times a voice print substantially matching that of the incoming caller has been heard by the emergency response system before, or other useful metadata such as dispositions of past calls with substantial matches of the caller's voice.

16 Claims, 3 Drawing Sheets

(56)         References Cited

U.S. PATENT DOCUMENTS

| 11,943,383 | B2 * | 3/2024 | Guan | ..................... | G10L 17/04 |
| 2018/0082689 | A1 * | 3/2018 | Khoury | .................. | G10L 17/00 |
| 2021/0280171 | A1 * | 9/2021 | Phatak | ................... | G10L 25/27 |
| 2024/0420725 | A1 * | 12/2024 | Caven, III | ............. | G10L 25/66 |

* cited by examiner

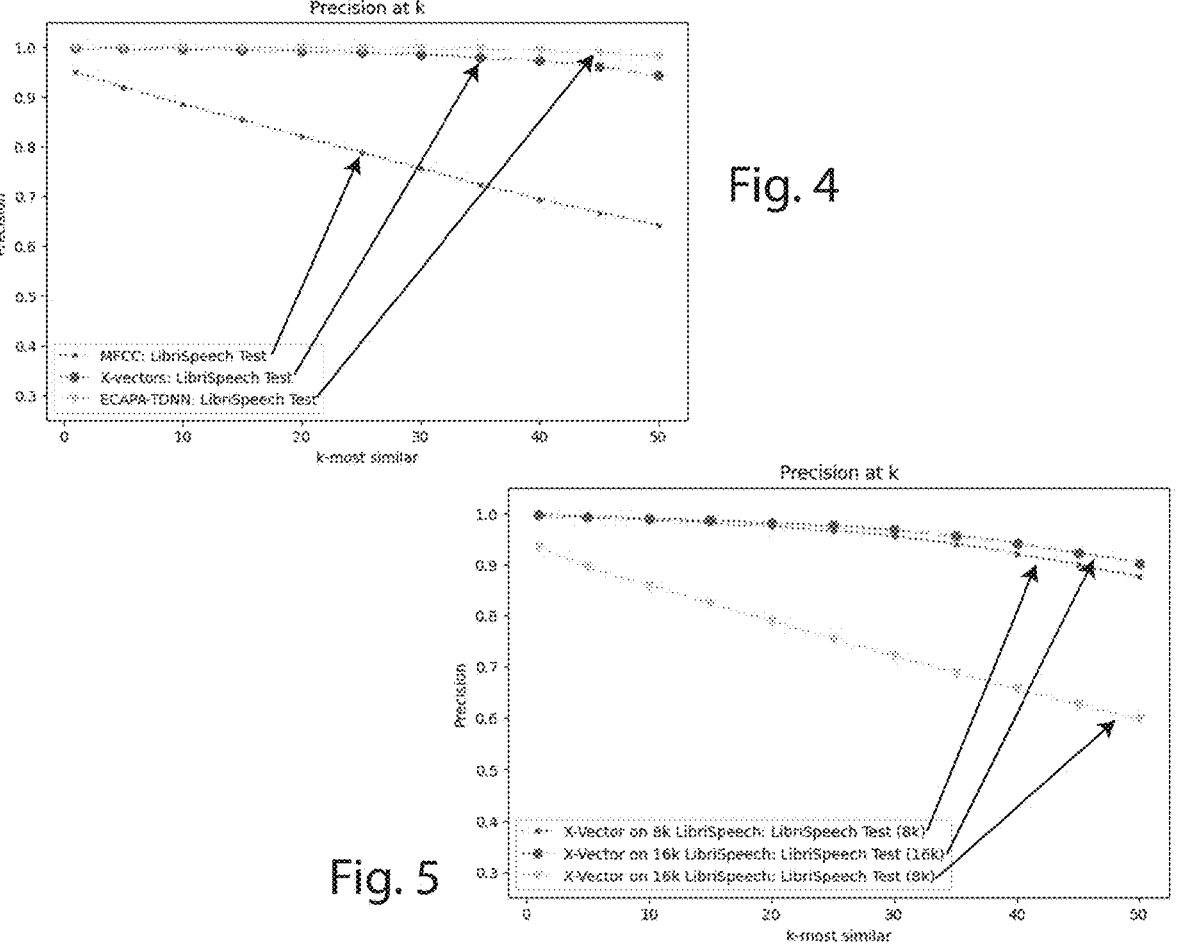
Fig. 4
Fig. 5
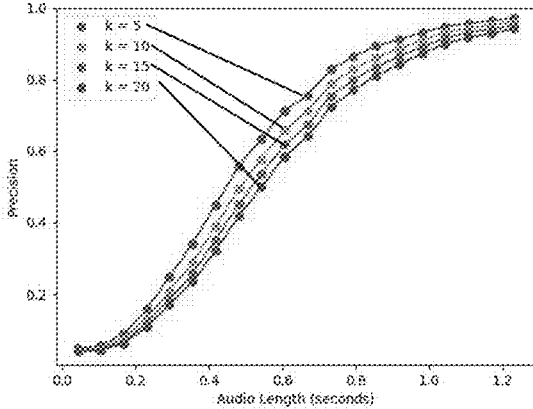
Fig. 6

VOICE FINGERPRINTING SYSTEM FOR DETECTING HOAX EMERGENCY REPORTS

TECHNICAL FIELD

The disclosure relates generally to emergency response systems and more particularly to a machine learning system for quickly retrieving past instances of a caller's voice. Metadata (such as the source or if a past instance of the voice was deemed to be a false report or hoax) and trends (such as the number of times a certain voice has made prior emergency reports) associated with these past examples augment operators' abilities to drive more informed decisions in emergent situations where outcomes can differ drastically based on information available.

BACKGROUND

This section provides background information related to the present disclosure which is not necessarily prior art.

Hoax 911 calls waste emergency responder resources and can lead to dangerous encounters between the innocent homeowner and law enforcement. In a practice known as swatting, the hoax caller reports an immediate threat to human life, to draw a response from law enforcement and the S.W.A.T to a specific location. When law enforcement officers arrive at the location, the innocent homeowner is taken by complete surprise, and the officers are on high alert, expecting an armed perpetrator to spring up any instant. Life threatening mistakes can easily occur.

The hoax calling problem widespread across the globe. The BBC reported in June 2023 that a 54-year-old man who had made more than 250 hoax ambulance calls was finally arrested, convicted and banned from contacting any emergency service by phone, email, text or any other method— except in a genuine emergency situation.

The reasons that motivate certain persons to make hoax calls run the gambit from mental illness, mean-spiritedness, jealousy and revenge, to childhood pranksterism. While the motivations are many, current deterrents are few. The current emergency response network is designed to dutifully accept all incoming calls and has no practical way to cull the genuine emergencies from the hoaxes. Moreover, many hoax callers don't think they can be caught. Some hoax callers may even use untraceable burner phones or voice over IP (VOIP) numbers to evade detection.

SUMMARY

The disclosed voice fingerprinting system provides a solution to the hoax calling problem, by generating—while the emergency call is in progress—a numerical or other indication of how many times the voice fingerprint corresponding to that of the incoming caller has been heard before. Although knowledge of the number of prior calls does not directly identify the hoax caller, it does alert the emergency response operator that the call may be suspicious, and that suspicion can be communication to the law enforcement response team, so that they are mindful that the call is a potential hoax before they take action. Other possible embodiments include indicating to an emergency response operator detail about past instances of when a caller's voice was heard, such as the date, time, location, and disposition of the call.

Therefore, disclosed here is a system for alerting emergency call center operators when an incoming caller's voice has been heard by the emergency response system before or in other reference databases. The system employs generally a data capture system, a data store, and a query system.

The data capture system is coupled to the emergency response system so that it will capture speech utterances from incoming callers. The data capture system uses those utterances to construct embeddings (voice fingerprints) representing the captured speech utterances. These embeddings collectively define a latent vector space contained in a data store configured as a collection of vector records stored in a suitable computer readable medium. If desired the data store may be implemented using vector store or vector database management system.

The query system communicates with the data store and provides an interface accessible to the call center operators, alerting them substantially while an incoming emergency call is being received, the number of times embeddings substantially matching that of the incoming caller have been heard by the emergency response system before, or other useful metadata such as dispositions of past calls with substantial matches of the caller's voice.

In greater detail, the disclosed system provides a system for alerting emergency call center operators when an incoming caller's voice has been heard by the emergency response system before, as follows.

A data capture system captures speech utterances from plural callers and uses those utterances to construct embeddings for each of the plural callers.

A data store communicates with the data capture system for holding the embeddings for each of the plural callers as stored embeddings of a latent vector space.

The data capture system is coupled to the emergency response system and is operative to capture speech utterances from an incoming caller and to construct an embedding of the incoming caller.

A query system, receptive of the embedding of the incoming caller and communicating with the data store, compares the embedding of the incoming caller against the stored embeddings of the latent vector space.

The query system provides an interface accessible to the call center operators that alerts a call center operator— substantially while an incoming emergency call is being received—the number of times stored embeddings of the latent vector space substantially match the embedding of the incoming caller. The count may be computed by determining a similarity metric cutoff and then count instances in which the similarity measure exceeded the cutoff. This number thus represents how many times the incoming caller's voice has been heard by the emergency response system before. Other techniques for generating a meaningful hoax alert message to the operator may also be used.

BRIEF DESCRIPTION OF THE DRAWINGS

The drawings described herein are for illustrative purposes only of selected embodiments and not all possible implementations. The particular choice of drawings is not intended to limit the scope of the present disclosure.

FIG. 4 is a graph comparing performance of different models;

FIG. 5 is a graph showing effects of resampling;

FIG. 6 is a graph showing effect of audio length for different precision at k values;

DETAILED DESCRIPTION

Overview of an Exemplary Emergency Responder Network

The disclosed system is designed to provide, in real time to an emergency call operator, information on whether the incoming caller's voice has made emergency calls in the past, and if so, how many times. Having this information as the incoming emergency call is being processed places the call operator in a better position to probe the caller for information to determine if the emergency call is genuine or a hoax. Moreover, the call operator can relay any potential hoax suspicions to the emergency response team, so that life endangering mistakes can be avoided.

Figures 1, 2:
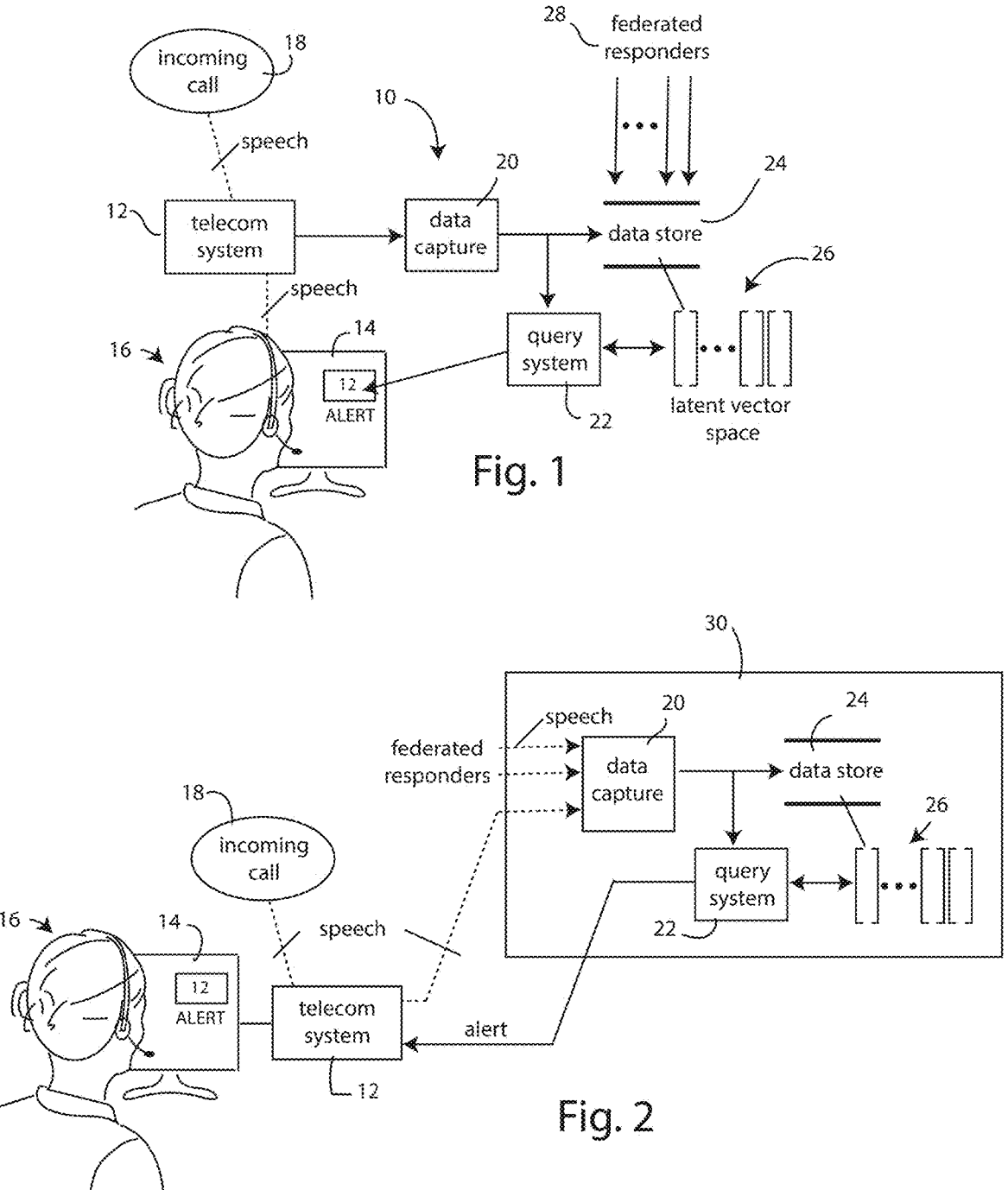
FIG. 1 is a block diagram of an exemplary voice fingerprinting system.
FIG. 2 is a block diagram of another exemplary voice fingerprinting system, illustrating how components of the system may be implemented using networked computers or cloud-based systems.

FIG. 1 shows the disclosed system in a standalone embodiment, where the major components are deployed at the call center site. FIG. 2 shows an alternate embodiment where the major components are deployed, as diagrammatically shown at 30, in the cloud-comprising a plurality of networked computers assembled and configured to provide the disclosed call screening functionality as a service. The following description applies to both embodiments.

Referring to FIGS. 1 and 2, the voice fingerprinting system is shown generally at 10. The system is configured to communicate with a call center telecom system 12. The emergency response call operator 16 uses the telecom system headset with boom mic to handle incoming calls, with data about the call, such as date, time, caller ID (when available) and other call metadata which may be available from the telecom company being provided on an integrated computer display screen 14. In FIG. 1, an incoming call is shown diagrammatically at 18. As depicted by the dotted line, the incoming call consists of speech utterances originating from the caller, which are passed as speech data through the telecom system 12 to the headset worn by the operator 16.

Telecom systems today may transmit speech utterances in either an analog or a digital form, depending on the design of the particular telecom infrastructure. In either case, the incoming call embodies time-varying speech audio.

The major components of the voice fingerprinting system include a data capture system 20 and a query system 22. These two systems work in conjunction with a data store 24 where speech embeddings used by the query system are stored.

The voice fingerprinting system uses the data store 24 to store vectors of extracted speaker-characterizing embeddings, for each utterance processed by the system. These vectors are referred to herein as voice fingerprints.

Notably, whereas a conventional system for speaker identification or verification requires an exemplar embedding record for each person intending to use the system collected in an enrollment database before each person can use it, the disclosed voice fingerprinting system simply generates a separate voice fingerprint (embedding vector) for each utterance received before searching for similar voice fingerprints. Thus the data store 24 stores a plurality of embedding vectors (voice fingerprints) corresponding to each incoming call that was handled by the system. Collectively this stored data comprises a latent vector space (a set of embedding vectors) representing each of the captured speech utterances.

While it is possible to capture and save the speech audio and other available metadata from an incoming call, these data are not necessary to perform the primary function of displaying how many times a given voice fingerprint has been captured before, or other useful metadata information, such as the disposition of past calls. The optional speech audio and other metadata, when available, can help to identify the person who made the call for subsequent forensic analysis.

It bears noting that the embedding vector, or voice fingerprint, for each incoming caller is typically captured within the first few seconds (or less) of an incoming caller's first utterance. It is thus very much like a fingerprint (left in an instant touch). It is not necessary to capture a lengthy recording of what the incoming caller has said; experimentation indicates that retrieval performance begins asymptotically reaching its maximum after around 1 second of query audio (FIG. 6).

This nearly instantaneous capture of a voice fingerprint is possible in part because the disclosed voice fingerprinting system uses highly discriminative speech features to model the utterance and also because the system is supported by an efficient neural network processor.

Comparing the embodiments of FIGS. 1 and 2, the standalone embodiment of FIG. 1 deploys the data capture system 20, the query system 22 and the data store 24 at the local telecom system site. It will be understood that the local site may have several networked facilities within a geographic territory. In such case the data capture, query and data store systems may be deployed on a local server and shared with all facilities on the same local network.

The embodiment of FIG. 2 deploys the data capture system 20, the query system 22 and the data store 24 in a remote data center or cloud-based system 30 accessible to the local telecom system sites via the internet.

It will be understood that FIGS. 1 and 2 represent but two examples of different possible system component deployment options. Other permutations are possible.

Details of Data Capture and Query Processes

Figure 3:
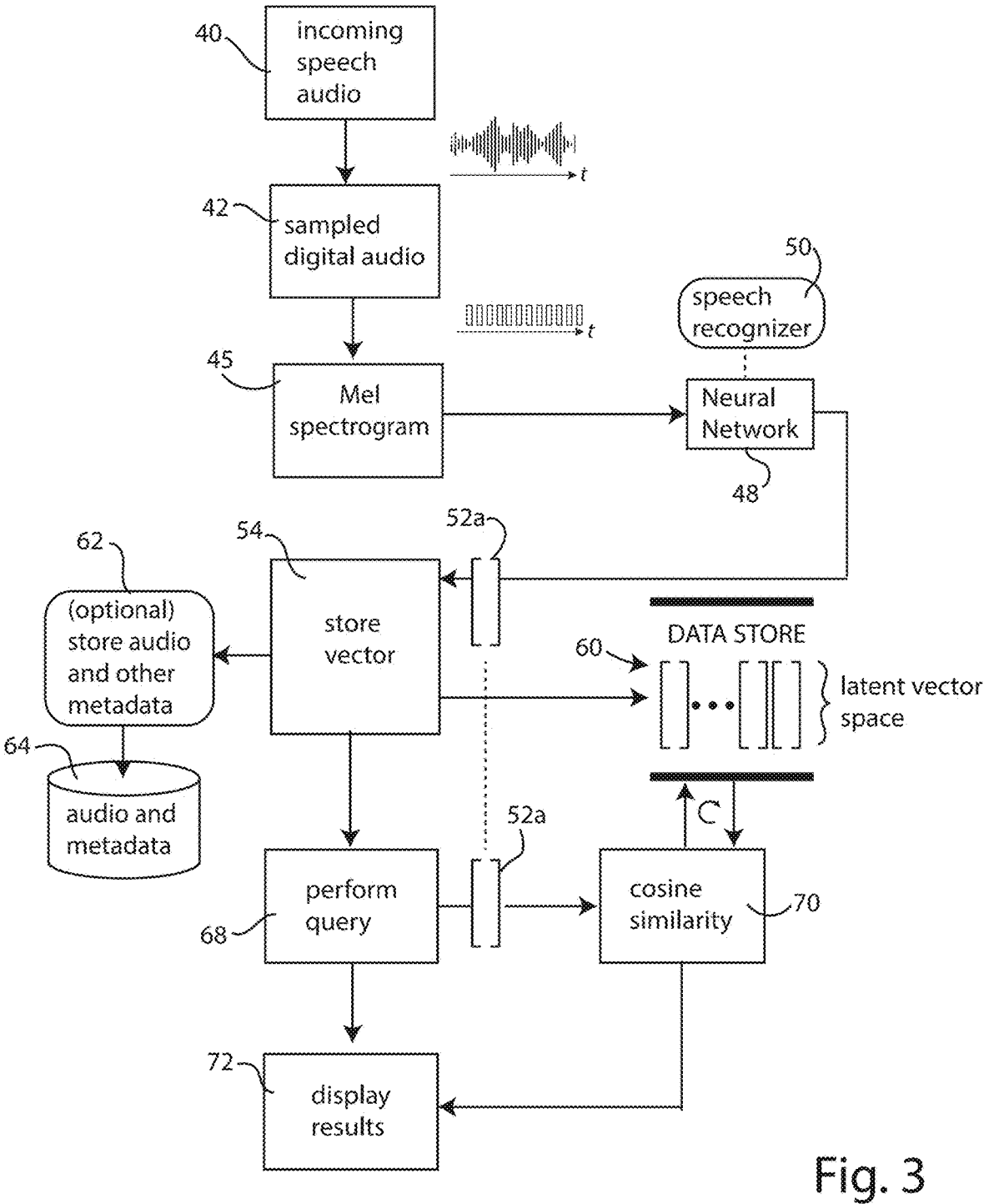
FIG. 3 is a process flow diagram and system diagram useful for understanding how the voice fingerprinting system operates.

Referring to FIG. 3, the data capture and query processes will now be explained. Incoming speech audio 40 is captured from the incoming call 18 (FIGS. 1 and 2). For illustration purposes it shall be assumed that the incoming speech audio 40 arrives as a time-varying analog waveform, as diagrammatically illustrated. This analog waveform is then sampled at 42 to produce time-varying digital audio data, as diagrammatically illustrated. If the incoming call arrives already in digital form then analog-to-digital conversion is not required.

Time domain (time-varying) digital audio data captures the utterance well for the purpose of replaying the data to reproduce intelligible speech. However, for automated speech recognition, verification and identification purposes, time-domain data are not very useful. First, samples of time-varying speech utterances are hard to compare with one another because the sample lengths are not likely to be uniform, and because it is unlikely that two samples will be correlated second-by-second. Second, time-domain speech data does not effectively represent the nuances of human speech.

Thus the disclosed system relies on digitally transformed data that express the utterances, not in the time domain, but in the cepstral domain. The cepstral domain involves transforming the time domain data into frequency domain data and then performing further transformations into the cepstral domain, which emphasizes the tonal qualities corresponding to different anatomical properties of the human vocal system. In this way the utterance data are transformed into a form that highly discriminates between utterances of one person to the next.

To make these data useful for comparison, a set of predefined cepstral coefficients are used, allowing each utterance to be represented by a uniform length vector of these set of cepstral coefficients. In this form the utterance is represented by a single uniform length vector known as an embedding. The processing step of generating an embedding is depicted beginning at 45, where the sampled digital audio is represented as a Mel Spectrogram as a preprocessing step. The preferred embodiment uses a Mel Spectrogram as input to the neural network 48. The neural network is a configured to function according to a speech recognizer model, shown diagrammatically at 50. The speech recognizer model 50 is generally capable of generating speech embeddings useful for speaker identification and speaker verification, and can be trained for such tasks in various ways. The embedding produced by the neural network is depicted by vector 52 in FIG. 3.

Details of Neural Network

While various neural network designs may be suited to the task of generating embeddings from human utterances, one preferred embodiment uses an architecture known as Emphasized Channel Attention Propagation and Aggregation in Time Delay Neural Network (ECAPA-TDNN). The ECAPA-TDNN uses statistics pooling to project variable-length utterances into fixed-length speaker characterizing embeddings. Other neural networks may also be used to create the speaker embeddings, such as a time-delay neural network. A discussion of how these architectures perform is provided below in the Validation and Evaluation section of this disclosure.

Latent Vector Space Data Store

Once the embedding vector 52a is generated, the system retains the embedding vector 52a in local memory for subsequent query operations. This newly generated embedding vector is also stored at step 54, in a data store 60, adding it to the collection of previously generated embedding vectors.

Data store 60 may be implemented using suitable non-transitory computer readable memory, such as random-access memory or the like. If desired vector database management technology providing vector indexing and vector data management may be used. In either implementation, the collection of data in data store 60 represents a latent vector space that is used in subsequent query operations.

Optional Audio and Metadata Storage

The data store containing a collection of embedding vectors contains sufficient information for the system to perform a primary function of alerting the user to how many times the system has "heard" the incoming caller's voice fingerprint.

However, if desired the basic system can be enhanced by providing additional storage to store at least a portion of the time-domain digital audio extracted from an incoming call, along with other metadata that may have forensic value. This is illustrated by the optional step 62, which stores captured audio and other metadata in a database 64.

One way to couple a record in database 64 with its the corresponding embedding vector (stored in data store 60), is to index the vector records in the data store and then store the associated index value together with the captured audio and other metadata in database 64. With this technique the index value would also be stored as part of each vector record in the data store. Some commercially available vector database architectures inherently index stored vector embeddings and such indices can be linked to selected records in database 64.

An alternate technique which does not require indexing is to compute a checksum from the floating-point values stored in the embedding vector and store that checksum in association with the captured audio and other metadata in database 64. Because summation of floating point numbers can produce numerical errors, a compensated summation algorithm, such as the Kahan summation algorithm, may be used to reduce this error. Using checksums for record linking is generally slower and not as digitally precise as using the indexing method. It can nevertheless produce forensically useful results for some applications.

In FIG. 3, database 64 is shown separate from data store 60 to emphasize the functional differences. In this implementation, data store 60 is a vector storage system to manage the fingerprint embeddings. Database 64 is a relational database capable of storing a variety of different types of metadata. However, if desired both data systems can be embodied using an enhanced vector database system which supports storage and rapid searching of vectors, and also supports managing of metadata storage.

In some federated implementations, it may be unnecessary to store optional audio and other metadata at each data capture facility. If forensic analysis requires access to the optional data stored at one facility, it can be obtained by specifying the index number associated with the embedding vector.

Query System

The query system 22 (FIGS. 1 and 2) performs a comparison between the embedding vector 52a of the incoming speech audio with the records stored in data store 60. While various comparison algorithms may be used, the disclosed embodiment uses a cosine similarity metric, represented by Eq. 1 below, where vector Q represents the query embedding (vector 52a) and vector $D_l$ represents each of the embedding vectors stored in the data store 60.

$$\cos \theta = \frac{\overline{Q} \cdot \overline{D_l}}{\|\overline{Q}\| \, \|\overline{D_l}\|} \qquad \text{Eq. 1}$$

The cosine similarity metric essentially measures the vector angle between two embedding vectors (the query embedding 52a and one of the stored vectors in data store 60). For a given query vector, the metric is applied iteratively across the span of vector records in data store 60.

Cosine similarity values can range from [−1, 1], where higher values indicate more similar embeddings. Completely identical vectors result in a similarity score of 1. Completely opposite vectors result in a similarity score of −1. In practice, most similarity scores fall between the range [0, 0.99].

Validation and Evaluation

To validate the disclosed system, we use Mel-Frequency Cepstrum Coefficients (MFCCs) as baseline embeddings. Beyond the baseline approach, we use a mix of neural networks to generate embeddings, using implementations from SpeechBrain:

[M. Ravanelli, T. Parcollet, P. Plantinga, A. Rouhe, S. Cornell, L. Lugosch, C. Subakan, N. Dawalatabad, A. Heba, J. Zhong, J.-C. Chou, S.-L. Yeh, S.-W. Fu, C.-F. Liao, E. Rastorgueva, F. Grondin, W. Aris, H. Na, Y. Gao, R. De Mori and Y. Bengio, "SpeechBrain: A General-Purpose Speech Toolkit," arXiv, 2023.].

For neural networks, we use two distinct model architecture families, namely X-Vectors and ECAPA-TDNN:

D. Snyder, D. Garcia-Romero, G. Sell, D. Povey and S. Khudanpur, "X-Vectors: Robust DNN Embeddings for Speaker Recognition," in 2018 IEEE International Conference on Acoustics, Speech and Signal Processing (ICASSP), Calgary, 2018.]

[B. Desplanques, J. Thienpondt and K. Demuynck, "ECAPA-TDNN: Emphasized Channel Attention, Propagation and Aggregation in TDNN Based Speaker Verification," in Interspeech, Shanghai, 2020].

Dataset

We use the open-source LibriSpeech dataset [1]. This corpus contains approximately 1000 hours of 16 kHz read English speech from audiobook recordings. LibriSpeech contains both transcriptions and speaker identity labels. We use the provided subset splits, which are train-clean-100, train-clean-360, train-other-500, dev-clean, dev-other, test-clean, and test-other. Unless otherwise noted, when we refer to the train subset, we mean the aggregation of train-clean-100, train-clean-360, and train-other-500, and so forth. To ensure the data was not biased or overly skewed, the audio distribution by speaker, speaker distribution by sex, and audio length distribution by file was investigated. Most audio samples are in the range of 2 to 15 seconds. Each speaker has less than 30 minutes of audio). The dataset is mostly balanced across the sex variable; see Table 1.

TABLE 1

| Subset | Female | Male |
| --- | --- | --- |
| Train | 0.483 | 0.517 |
| Dev | 0.507 | 0.493 |
| Test | 0.498 | 0.502 |

We experiment with models trained on audio with a sample rate of 16 k and 8 k. We evaluated a total of 7 embedding models, some pre-trained foundational models trained on the VoxCeleb dataset as well as models we trained ourselves on the LibriSpeech dataset. See Table 2

[A. Nagrani, J. S. Chung and A. Zisserman, "VoxCeleb: A Large-Scale Speaker Identification Dataset," in Interspeech, 2017]

TABLE 2

| Embedding models | | | |
| --- | --- | --- | --- |
| Model | Sample rate | Latent space dimension | Pretrained? |
| MFCC | 8K/16K | 256 | N/A |
| spkrec-ecapa-voxceleb | 16K | 192 | Yes, VoxCeleb |
| spkrec-ecapa-voxceleb | 16K | 512 | Yes, VoxCeleb |
| librispeech-8k-ecapa | 8K | 192 | No |
| librispeech-8k-xvector | 8K | 512 | No |
| librispeech-16k-ecapa | 16K | 192 | No |
| librispeech-16k-xvector | 16K | 512 | No |

For computing system evaluation metrics, we take an evaluation dataset and compute embeddings for each audio sample in the dataset. This process iterates through all pairs of latent-space embeddings and speaker identities in the database. For each pair, we identify the k most similar embeddings, from the rest of the database to the query embedding. We then calculate the precision between the query's speaker identity, and the speaker identities of the k returned samples. Finally, we average the precision across all pairs to generate an aggregate metric for the embedding mode. Precision is defined below in Eq. 2, with TP indicating the number of True Positives (in other words, the retrieved audio's speaker identity matches the query audio's identity) and FP indicating the number of False Positives (or number of times that the retrieved audio's speaker identity does not match).

$$\text{Precision} = \frac{TP}{TP + FP} \qquad \text{Eq. 2}$$

Metrics computation is repeated at multiple values for k=[1, 5, 10, . . . 45, 50] where we evaluate the precision when returning greater or fewer number of samples to further understand the proportion of correct speakers in the top k samples. We expect to see greater precision when returning a fewer number of files from the database, since these are the most similar to the query. We expect to see slightly lower precision when returning a greater number of files from the database, since lower-ranked files returned may not have as high of similarity with the query, or if there are less than k examples of a particular speaker's voice for a given k. Precision at k is a common metric used in information retrieval problems such as this one; in the context of this problem, it can be interpreted as, "the proportion of correct speakers in the top k results." Unless otherwise specified, we use the LibriSpeech test subset for evaluation, which contains 5,559 audio files (10.75 hours) distributed across 73 speakers.

8K Resampling Experiment

The LibriSpeech dataset contains audio at a sample rate of 16,000 samples per second. To assess whether the voice fingerprinting would work for lower-quality audio, such as with an 8,000 Hz sample rate, we performed several experiments to answer this question. As a naïve approach, we first ran system evaluation with the existing trained models using a dataset that was downsampled from a 16 k sample rate to 8 k. The existing trained models relied on a 16 k sample rate, so we upsampled back to a 16 k sample rate by interpolating. We then trained new models on the audio that was downsampled to 8 k. In addition, we trained new models on the 16 k data because we did not have access to the VoxCeleb dataset, to enable a fair comparison.

Audio Length Experiment

Another important question is how much long of a query audio sample is needed to perform retrieval. To set up this experiment, we use the best performing model, ECAPA-TDNN trained on the VoxCeleb dataset and evaluate retrieval on the Test subset of the LibriSpeech dataset. We do this by randomly selecting a small portion of each query audio file. We perform multiple runs, where on each run we incrementally select more audio of each given query sample, ranging from $\frac{1}{16}$ of a second to 1.25 seconds in length by $\frac{1}{16}$ second increments. We aggregate the results by amount of query audio to characterize the performance.

Experiment Results

To evaluate the system design described above, we use the LibriSpeech Test subset and compute precision for a range of values. We compare it against the MFCC method, as well as a null model that returns random results rather than returning them based on their ranked similarity to the query file. We first use a pretrained ECAPA-TDNN and X-vector models that were trained on the VoxCeleb dataset. Both ECAPA-TDNN and X-vectors significantly outperform the baseline MFCC approach, with ECAPA-TDNN only slightly outperforming X-vector at higher k values; see FIG.

4. Table 3 shows results at k=10, as well as null model results (not shown on FIG. 4 as they are consistent across all k).

TABLE 3

| Pretrained results at k = 10 | |
| --- | --- |
| Experiment (Embedding Model) | Precision (k = 10) |
| Null model | 0.0156 |
| MFCC | 0.8852 |
| X-vector | 0.9952 |
| ECAPA-TDNN | 0.9993 |

8K Resampling Experiment

To investigate how the sample rate impacts retrieval performance, we downsampled the LibriSpeech test dataset and interpolated back to 16 k to evaluate the system on downsampled data. In addition, we trained a new model on the LibriSpeech train dataset to serve as a fair comparison for 16 k performance. We find that when using a model trained on 16 k data and downsampling input data from 16 k to 8 k, then interpolating back to 16 k leads to a loss in performance. However, when training a new model on downsampled 8 k audio, we find that performance is nearly identical to 16 k performance; see FIG. 5 and Table 4.

TABLE 4

| Resampling experiment | | |
| --- | --- | --- |
| Model | Test data | Precision @ 10 |
| X-vector trained on 16k audio | LibriSpeech Test, 16k | 0.9897 |
| X-vector trained on 16k audio | LibriSpeech Test, 8k (upsampled back to 16k) | 0.8584 |
| X-vector trained on 8k audio | LibriSpeech Test, 8k | 0.9870 |

Note that the results shown in Table 4 differ slightly from Table 3 (0.9897 for X-vector here versus 0.9952 in Table 3) because in this experiment we trained the X-vector model on the LibriSpeech dataset for a fair comparison.

Audio Length Experiment

The audio length results are graphed in FIG. 6. As the audio length increases, the precision at k also increases, as expected—the model has more information about the sample for retrieval when the length is longer. We notice that beyond approximately 0.8 seconds to 1.0 seconds, performance increases taper off. In other words, there is diminishing value to having more than 1 second of audio. The outcome demonstrates that the ECAPA-TDNN model can accurately compute embeddings for audio, even when the length is relatively small, resulting in high precision at k for retrieval.

Utility and Advantages

The disclosed voice fingerprinting system can be operated as a standalone system used by a local emergency responder unit, or it can be part of a federated system that pools voice fingerprint embeddings from a larger geographical region. The system is designed to serve a variety of different emergency responder organizations, 911 call centers, FBI, Coast Guard, etc. Regardless of the organization that received the call, the voice fingerprint embeddings can be pooled into a common data store.

The voice fingerprint data capture process is designed to be ongoing—it collects data 24 hours a day, 7 days a week. The system does not inherently capture the speaker's name, address, phone number or other information used to identify who the caller's voice belongs to. This greatly obviates privacy concerns because the users of the system only know how many times a voice has been used to make emergency calls. However, if there is probable cause to believe that a hoax call has been placed—based on the voice having been used an inordinate number of times—proper legal channels can be used to access metadata stored across a federated system to determine if traceable identification information can be found. In this regard, it bears noting that in a federated system, it is not necessary to store any captured audio and other metadata at every facility.

The disclosed voice fingerprinting system may also be used in conjunction with a forensic analysis tool, where the embeddings in data store 60 (FIG. 3) can be combined with additional embeddings extracted from speech from known speakers, such as speech captured from YouTube and other social media platforms. The speaker identifying metadata from these non-emergency responder systems may be useful in identifying who made a series of hoax calls.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment.

The invention claimed is:

1. A system for alerting emergency call center operators when an incoming caller's voice has been heard by the emergency response system before, comprising:

a data capture system that captures speech utterances from plural callers and uses those utterances to construct embeddings for each of the plural callers;

a data store communicating with the data capture system for holding the embeddings for each of the plural callers as stored embeddings of a latent vector space;

the data capture system being coupled to the emergency response system and operative to capture speech utterances from an incoming caller and construct an embedding of the incoming caller;

a query system receptive of the embedding of the incoming caller and communicating with the data store to compare the embedding of the incoming caller against the stored embeddings of the latent vector space;

the query system providing an interface accessible to the call center operators that alerts a call center operator, substantially while an incoming emergency call is being received, the number of times stored embeddings of the latent vector space substantially match the embedding of the incoming caller, wherein the number represents how many times the incoming caller's voice has been heard by the emergency response system before.

2. The system of claim 1 wherein the data capture system captures speech utterances from the plural callers by being coupled to the emergency response system.

3. The system of claim 1 wherein the data capture system converts speech utterances from a time-domain representation into a cepstral domain representation.

4. The system of claim 1 wherein the data capture system converts speech utterances into a Mel spectrogram representation.

5. The system of claim 1 wherein the data capture system converts speech utterances into Mel-Frequency cepstral coefficients.

6. The system of claim 1 wherein the data capture system includes a neural network configured as to project variable-length utterances into fixed-length speaker characterizing embeddings.

7. The system of claim 1 wherein the data capture system includes a time delay speaker verification TDNN neural network.

8. The system of claim 7 wherein the time delay neural network is selected from the group consisting essentially of an Emphasized Channel Attention, Propagation and Aggregation TDNN and an X-Vectors neural network.

9. The system of claim 1 wherein the query system compares the embedding of the incoming caller against the stored embeddings of the latent vector space using a similarity metric.

10. The system of claim 1 further comprising a database linked to the data store for storing speaker audio associated with at least some of the stored embeddings of the latent vector space.

11. The system of claim 1 further comprising a database linked to the data store for storing metadata associated with at least some of the stored embeddings of the latent vector space.

12. The system of claim 1 wherein at least one of the data capture system, the data store and the query system are deployed on a network accessible to plural emergency response systems.

13. The system of claim 1 wherein the data capture system captures speech utterances from plural callers via a plurality of emergency response systems.

14. The system of claim 1 wherein the data capture system captures speech utterances from plural callers at least one source of speech utterances that is not substantially associated with an emergency response system.

15. The system of claim 14 wherein at least one source is internet based open-source intelligence.

16. The system of claim 1 wherein the data capture system is further coupled to receive speech utterances from a forensic source not substantially associated an emergency response system.

* * * * *